(12) United States Patent
Lo

(10) Patent No.: US 9,674,974 B1
(45) Date of Patent: Jun. 6, 2017

(54) DETACHABLE ANTI-WRITE DEVICE FOR A MEMORY CARD

(71) Applicant: Yu-Nan Lo, Taichung (TW)

(72) Inventor: Yu-Nan Lo, Taichung (TW)

( * ) Notice: Subject to any disclaimer, the term of this patent is extended or adjusted under 35 U.S.C. 154(b) by 0 days.

(21) Appl. No.: 15/168,227

(22) Filed: May 30, 2016

(51) Int. Cl.
*H05K 5/02* (2006.01)
*H05K 5/00* (2006.01)
*H05K 5/03* (2006.01)

(52) U.S. Cl.
CPC ......... *H05K 5/0217* (2013.01); *H05K 5/0091* (2013.01); *H05K 5/0221* (2013.01); *H05K 5/03* (2013.01)

(58) Field of Classification Search
None
See application file for complete search history.

(56) References Cited

U.S. PATENT DOCUMENTS 6,739,515 B1 *  5/2004  Wallace ............... G06K 19/077
                                                                235/492

* cited by examiner

*Primary Examiner* — Kristy A Haupt
(74) *Attorney, Agent, or Firm* — Bruce Stone LLP; Joseph Bruce

(57) ABSTRACT

A detachable anti-write device for a memory card includes: an insulated housing including an upper cover and a lower cover which are connected to each other; and an anti-write switch disposed a lateral edge of the insulated housing and connected to the insulated housing by a break away connecting member. The anti-write device can be irreversibly broken and detached from the memory card, therefore is capable of improving the security of the data stored in the memory card.

3 Claims, 4 Drawing Sheets

US 9,674,974 B1

DETACHABLE ANTI-WRITE DEVICE FOR A MEMORY CARD

BACKGROUND

Field of the Invention

The present invention relates to an anti-wire device for a memory card, and more particularly to an irreversibly detachable anti-write device for a memory card.

Related Prior Art

As memory card, SD (secure digital memory card) has found wide application in portable devices, such as digital cameras, personal digital assistant (PDA) multimedia player, and etc. SD card is based on MMC (multimedia card) format, but is slightly thicker than MMC. SD cards provide faster data transmission and constantly updates standard. Most the SD cards are designed with anti-write protection, and a small portion of the SD cards even support DRM (digital right management).

The anti-write protection switch is disposed at a lateral surface of the SD card. The SD card will be anti-write protected, namely, can be read only but cannot be written when the anti-write protection switch is switched on. Write is allowed only when the anti-write protection switch is switch off. Some SD cards are designed with no anti-write protection since the anti-write protection switch is optional. The anti-write protection switch works in the same way as the anti-write protection of the cassette tape, VHS tape, and the computer disk. The card will become a write-only card, if the anti-write protection switch is broken.

Therefore, based on the conventional anti-write protection design, the present invention provides an irreversibly detachable anti-write device for a memory card, the anti-write device will be thrown away and cannot be used again once broken, which makes the SD card become a read-only memory card.

SUMMARY

The present invention is aimed at providing an irreversibly detachable anti-write device for a memory card, which is capable of improving the security of the data stored in the memory card, and solving the disadvantage of the conventional anti-write device that the conventional anti-write switch is a slide member to control locking and unlocking of the memory card.

Therefore, a detachable anti-write device for a memory card in accordance with the present invention, comprises: an insulated housing including an upper cover and a lower cover which are connected to each other; and an anti-write switch disposed a lateral edge of the insulated housing and connected to the insulated housing by a break away connecting member.

Preferably, the anti-write switch is disposed in a cavity formed in the lateral edge of the insulated housing.

Preferably, the break away connecting member has a first end connected to the bottom surface and a second end connected to the anti-write switch, and the first end is smaller in diameter than the second end.

Preferably, the break away connecting member has an average thickness less than 0.3 cm.

Preferably, the anti-write switch has a length smaller than or equal to a height of an inner surface of the cavity.

Preferably, the anti-write switch has a width smaller than or equal to a width of the lateral edge of the insulated housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

The present invention will be clearer from the following description when viewed together with the accompanying drawings, which show, for purpose of illustrations only, the preferred embodiment in accordance with the present invention.

Figure 1:
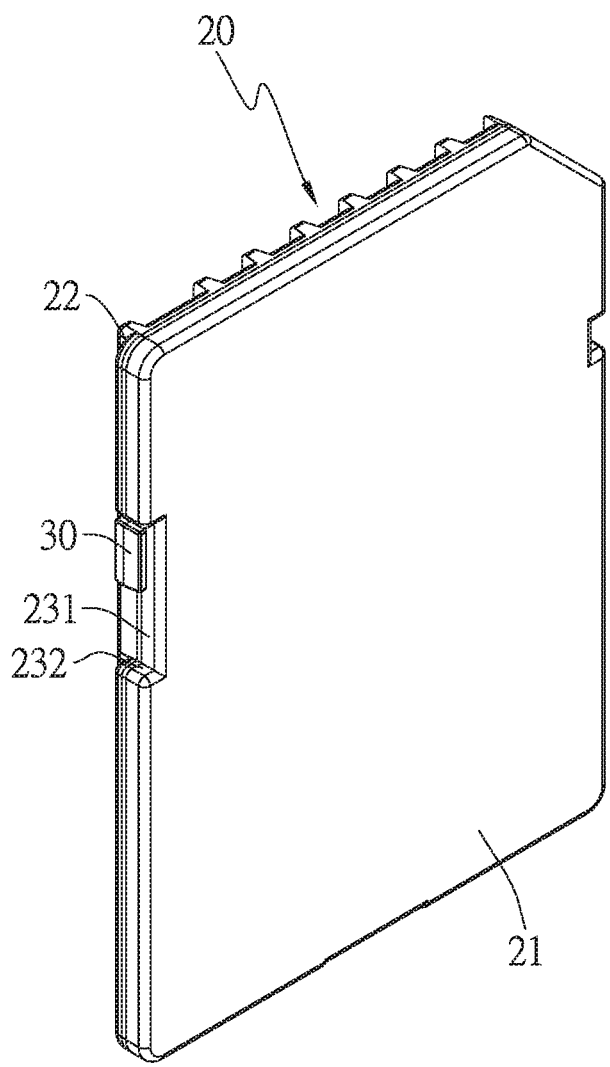
FIG. 1 shows that the detachable anti-write device for a memory card in accordance with the preferred embodiment of the present invention is in a writable-and-readable condition.
Figure 2:
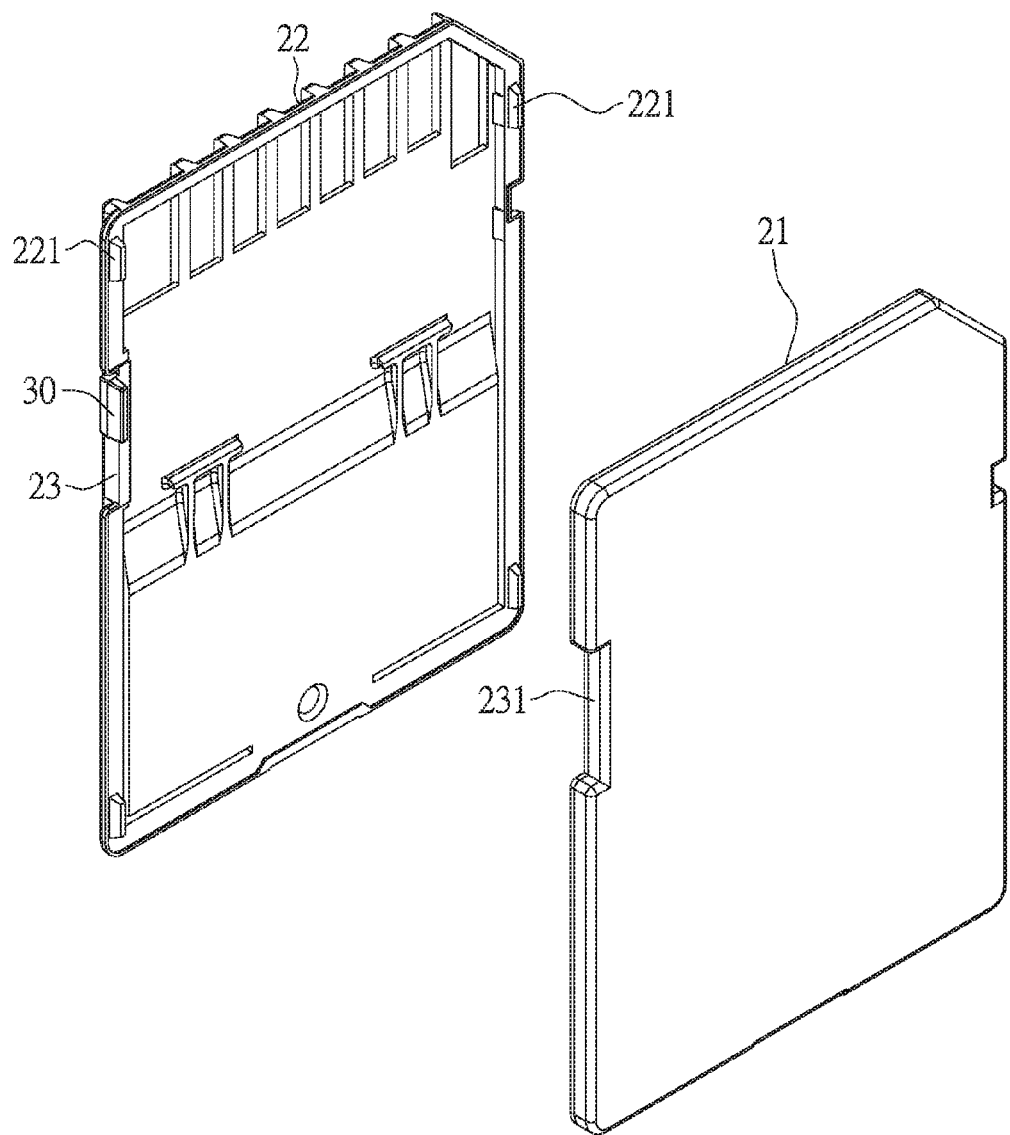
FIG. 2 is an exploded view of the memory card with a datable anti-write device in accordance with a preferred embodiment of the present invention.

Referring to FIGS. 1-2, a detachable anti-write device for a memory card in accordance with the preferred embodiment of the present invention, comprises: an insulated housing 20 and an anti-write switch 30.

The insulated housing 20 includes an upper cover 21 and a lower cover 22. The upper cover 21 is provided around a peripheral edge thereof with four engaging holes (not shown) for engaging with four engaging members 221 formed around a peripheral edge of the lower cover 22, so that the upper and lower covers 21, 22 are seamlessly connected together to form the insulated housing 20 to accommodate an electronic card (not shown).

Figure 3:
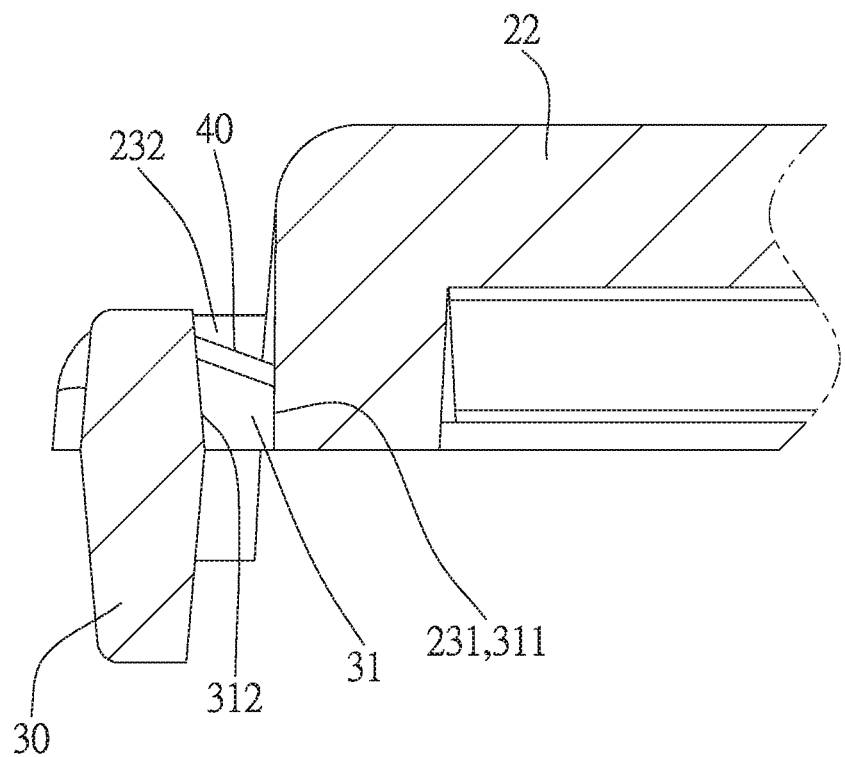
FIG. 3 is a cross sectional view of detachable anti-write device for the memory card in accordance with the preferred embodiment of the present invention.

The anti-write switch 30, as shown in FIGS. 1-3, the anti-write switch 30 is disposed in a cavity 23 formed in a lateral edge of the insulated housing 20. The cavity 23 is formed by corresponding concave structures of the upper and lower covers 21, 22. When the insulated housing 20 is closed, the cavity 23 is formed and includes a bottom surface 231 and two opposite inner surfaces 232. The anti-write switch 30 has a length smaller than or equal to a height of the inner surfaces 232 of the cavity 23, and has a width smaller than or equal to a width of the lateral edge of the insulated housing 20. By such arrangements, the anti-write switch 30 is flush with the peripheral edge of the insulated housing 20.

At the concave structure of the lower cover 22 is provided a break away connecting member 31 which is connected to the anti-write switch 30 and extends from the bottom surface 231 of the cavity 23. The break away connecting member 31 has a first end 311 connected to the bottom surface 231 and a second end 312 connected to the anti-write switch 30. As shown in FIG. 3 which is a cross sectional view, the break away connecting member 31 includes a slanting surface 40 inclined from the anti-write switch 30 toward the insulated housing 20, which means that the first end 311 is smaller in diameter than the second end 312. Plus, the break away connecting member 31 has an average thickness less than 0.3 cm, as a result, the break away connecting member 31 is strong enough to support the anti-write switch 30, but can be easily broken by the user to remove the break away connecting member 31 from the insulated housing 20.

Figure 4:
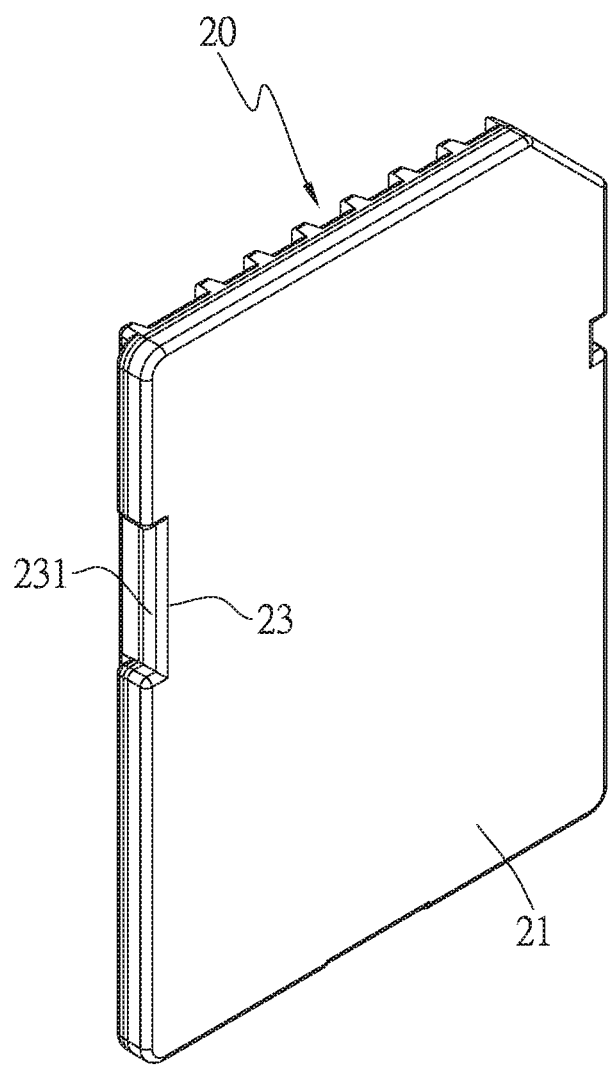
FIG. 4 shows that the detachable anti-write device in accordance with the preferred embodiment of the present invention is in a read-only condition.

FIG. 1 shows that the detachable anti-write device for a memory card in accordance with the preferred embodiment of the present invention is in a writable-and-readable condition, in which the anti-write switch 30 is connected to the insulated housing 20. In this condition, if the memory card is inserted in a memory device (not shown), the anti-write switch 30 will be detected and found by the memory device, and then the memory device is allowed to read or write the memory card. As shown in FIG. 4, the detachable anti-write device in accordance with the preferred embodiment of the present invention is in a read-only condition, in which the break away connecting member 31 is broken, and the anti-write switch 30 is therefore removed. In this condition, when the memory card is inserted in a memory device (not shown), the memory device cannot find the anti-write switch 30 and therefore will only be able to read the memory card.

While we have shown and described various embodiments in accordance with the present invention, it is clear to those skilled in the art that further embodiments may be made without departing from the scope of the present invention.

What is claimed is:

1. A detachable anti-write device for a memory card, comprising:
   an insulated housing including an upper cover and a lower cover which are connected to each other; and
   an anti-write switch disposed a lateral edge of the insulated housing and connected to the insulated housing by a break away connecting member;
   wherein the anti-write switch is disposed in a cavity formed in the lateral edge of the insulated housing, the break away connecting member has a first end connected to a bottom surface of the cavity and a second end connected to the anti-write switch, and the first end is smaller in diameter than the second end, and the break away connecting member has an average thickness less than 0.3 cm.

2. The detachable anti-write device for the memory card as claimed in claim 1, wherein the anti-write switch has a length smaller than or equal to a height of an inner surface of the cavity.

3. The detachable anti-write device for the memory card as claimed in claim 1, wherein the anti-write switch has a width smaller than or equal to a width of the lateral edge of the insulated housing.

* * * * *